March 18, 1941. E. HELLE Re. 21,754

SEWING MACHINE ATTACHMENT

Original Filed Oct. 15, 1936 3 Sheets-Sheet 1

Inventor

Earl Helle

By Clarence O'Brien
Hyman Berman

Attorneys

March 18, 1941. E. HELLE Re. 21,754

SEWING MACHINE ATTACHMENT

Original Filed Oct. 15, 1936 3 Sheets-Sheet 2

Inventor
Earl Helle

By Clarence O'Brien
Hyman Berman
Attorneys

March 18, 1941. E. HELLE Re. 21,754

SEWING MACHINE ATTACHMENT

Original Filed Oct. 15, 1936 3 Sheets-Sheet 3

Inventor

Earl Helle

By Clarence O'Brien
Hyman Berman

Attorneys

Reissued Mar. 18, 1941

Re. 21,754

UNITED STATES PATENT OFFICE 21,754

SEWING MACHINE ATTACHMENT

Earl Helle, Beardstown, Ill., assignor of fifty per cent to Lloyd M. McClure, Beardstown, Ill.

Original No. 2,079,317, dated May 4, 1937, Serial No. 105,782, October 15, 1936. Application for reissue April 25, 1939, Serial No. 269,944

8 Claims. (Cl. 112—79)

This invention relates broadly to sewing machines and more particularly to an attachment therefor for the purpose of rendering the machine useful in making what is generally known in the art as "hooked rugs."

An object of the present invention is to provide an attachment of the character suggested which may be readily and easily applied to the machine, and which when so applied will facilitate to a great extent, the making of hooked rugs.

The present invention is also characterized by the provision of a pair of slidably mounted needles movable in opposite directions relative to one another with one serving to punch a hole through the work, and the other serving to push the yarn through the hole as a part of the operation in the making or fabricating of hooked rugs or similar articles.

The invention, together with its objects and advantages will be best understood from a study of the following description taken in connection with the accompanying drawings wherein—

Fig. 9 is a fragmentary perspective view of a bracket plate illustrating certain details hereinafter more fully referred to, and Fig. 10 is a perspective view of a lug-equipped plate hereinafter more fully referred to.

Figure 9:
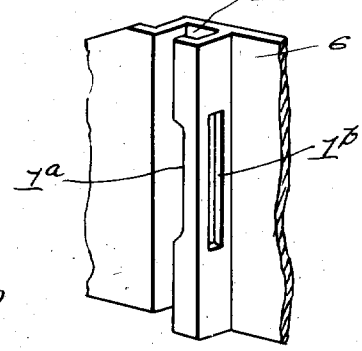

Referring more in detail to the drawings, it will be seen that in the preferred embodiment thereof, the invention comprises an attachment plate 2, which in the embodiment illustrated is adapted to replace the regular bobbin cover on a sewing machine. Plate 2 is provided with an angular material guide 3 provided with a slot 3ª for a purpose hereinafter made manifest.

Also attached to the head of the sewing machine through the medium of the screws or the like 19 is a head plate 6 that is adjusted to replace the regular head plate on a sewing machine.

Further in accordance with the present invention, there is attached to the bottom end of the regular needle bar 5 of the sewing machine a sleeve-like head 14.

The plate 6 is formed to provide on the inner side thereof a fixed guide sleeve 1 in which the shank 9 of a punching needle 8 works. The punching needle 8 is secured to the lower end of the shank 9 through the medium of a screw 17.

The shank 9 of the needle 8 is provided with a guide slot 9ª in which the shank 10 of a yarn pushing needle 10ª has a sliding fit.

Laterally mounted on the shank 9 of needle 8 is a roller 16 which operates in the slot 1ª provided therefor in guide sleeve 1, and extends into a notch 21ª provided in a lever 21, hereinafter more specifically referred to.

Arranged in the path of the roller 16 is the angularly disposed end 7ª of a lug 7 provided on one edge of a plate 7ᵇ secured to and spaced from the lever 21 and as indicated generally at 22.

The lever 21 at one end is pivoted to the head plate 6 as at 15, while at its relatively opposite end the lever 21 is provided with a slot in which works a pin 23 projecting laterally from the head 14.

Threaded through the lug end 7ª is a spring tensioned bolt or screw 11 that has its inner end arranged to bear on the aforementioned roller 16. Thus it will be seen that as lever 21 swings upwardly or in a counterclockwise direction the lower edge of slot 21ª engages the roller 16 mounted on the shank 9 of needle 8 causing needle 8 to move upwardly. Also, as lever 21 swings downwardly or in a clockwise direction the screw 11 engages the laterally extending roller 16 with the result that this downward movement of lever 21 is transmitted to the shank 9 of needle 8 for moving needle 8 downwardly. Thus it will be clearly seen that the movement of the lever 21 is transmitted to the needle 8 for raising and lowering the same. To vary the length of movement of needle 8 as may be required for different materials screw 11 is adjusted relative to roller 16 as may be required to cause the needle to move more or less deeply into the material to allow for the entry of heavy, or light yarn, respectively.

Further in connection with the operation of the device it will be understood that the needle 8 is provided with the usual eye 8ª through which the yarn is threaded, the ball of yarn or other material being held on the lap of the operator or in any convenient receptacle on the table of the sewing machine as may be found desirable. The eye of the needle 8 serves to hold the yarn in position for the operation of the punch bar 10ᵃ, it being understood that the punch bar 10ᵃ serves to carry the yarn through the burlap, canvas or other material incidental to the punching of a hole in the burlap or canvas.

The shank 10 of the needle 10ᵃ has projecting therefrom an apertured lug 10ᵇ to which is pivoted as at 12 one end of a lever 4. Intermediate its ends, the lever 4 is provided with a slot which accommodates a pin 13 projecting laterally from the inner side of the head plate 6. At its lower end, the lever 4 is provided with a slot 14ᵃ to receive the aforementioned pin 23. Thus it will be seen that the movement of the needle bar 5 will also be transmitted through the medium of the lever 4 to the yarn pushing needle 10ᵃ for moving the needle 10ᵃ up and down relative to the needle 8 for pushing the yarn through the hole first punched by the needle 8 in the burlap or other fabric carrying the design of the hooked rug being made.

From the description of the invention thus far, it will be seen that as the lever 21, in response to the upward movement of the needle bar 5 swings on its pivot 15, in a counter-clockwise direction, needle 8 will be caused to move upwardly, while at the same time lever 4 in response to the upward movement of the needle bar 5 will also swing in a counter-clockwise direction for transmitting a downward movement to the needle 10ᵃ, to the end that the needles 8 and 10ᵃ slide relative to one another and in reverse directions with respect to one another.

Figure 1:
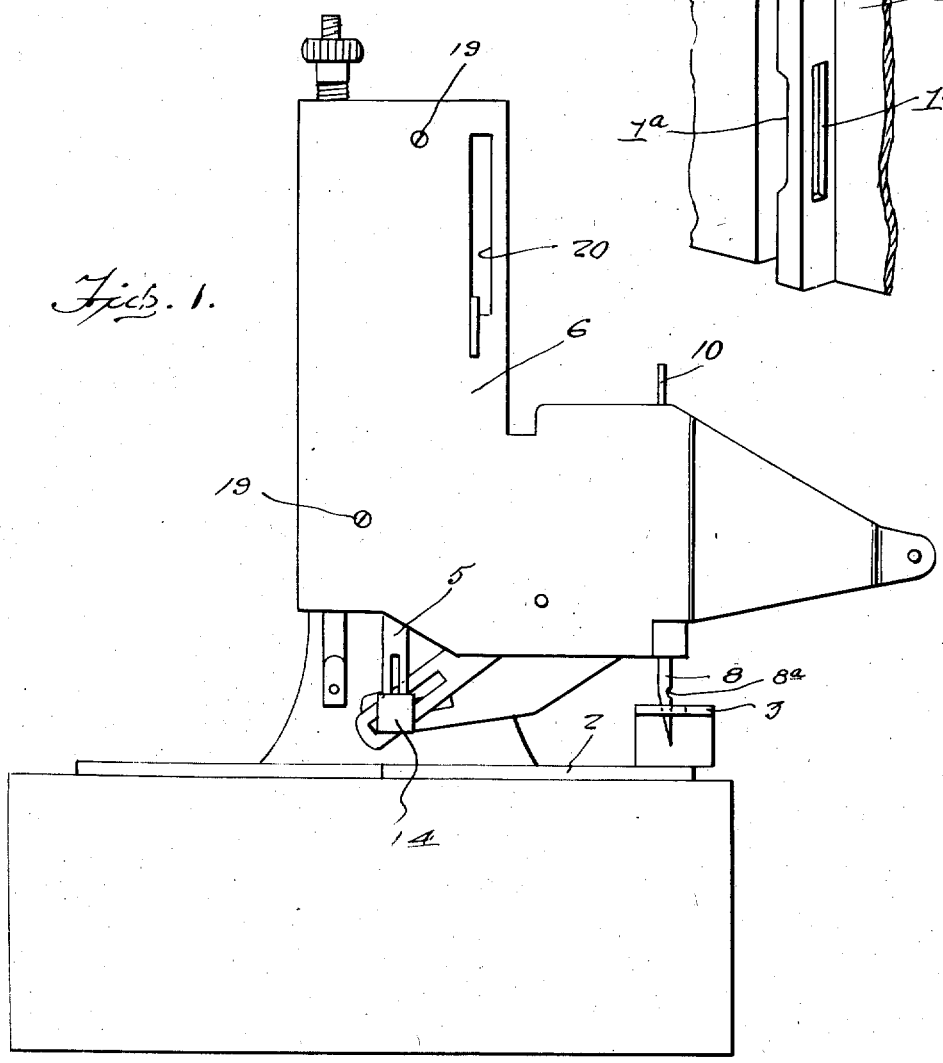
Figure 1 is an elevational view illustrating the application of the invention to a sewing machine.
Figure 10:
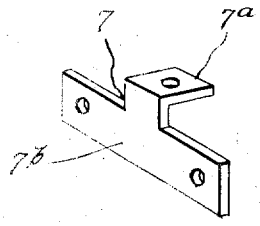
Figure 2:
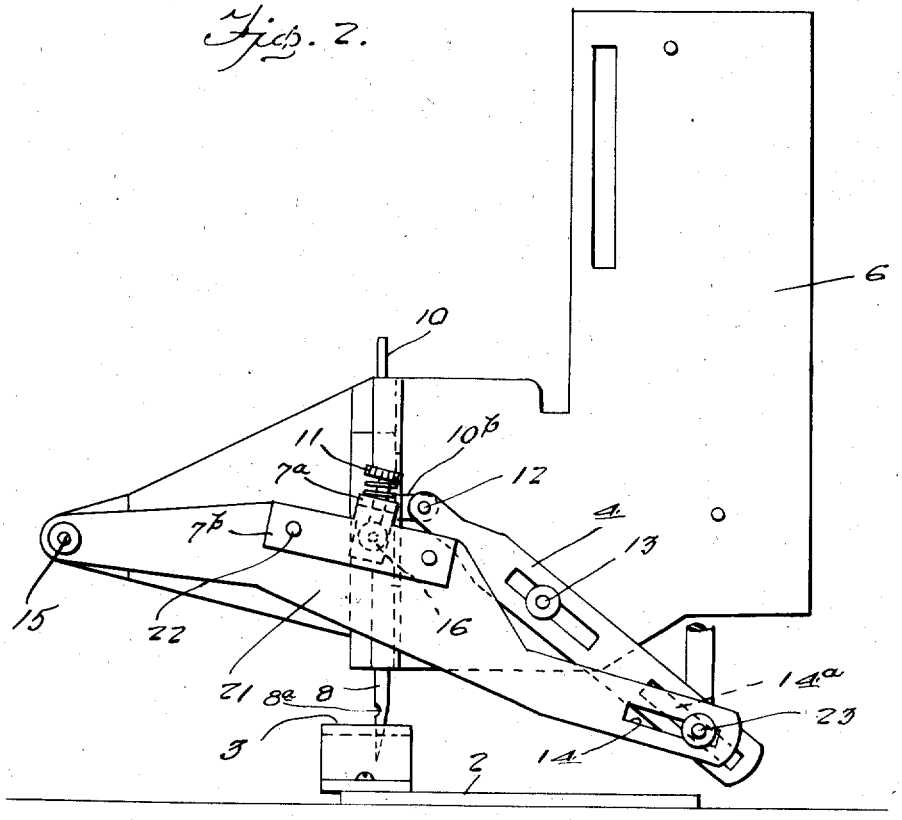
Fig. 2 is an elevational view viewing the attachment from the side thereof opposite to that shown in Fig. 1.
Figure 8:
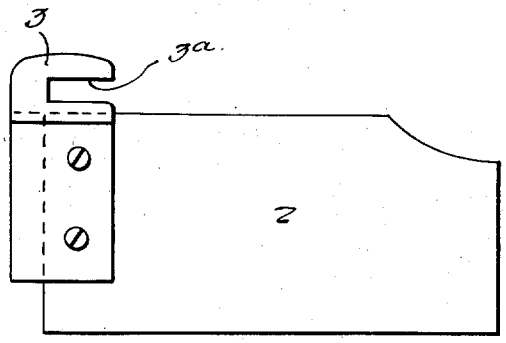
Fig. 8 is a plan view of a guide.
Figure 3:
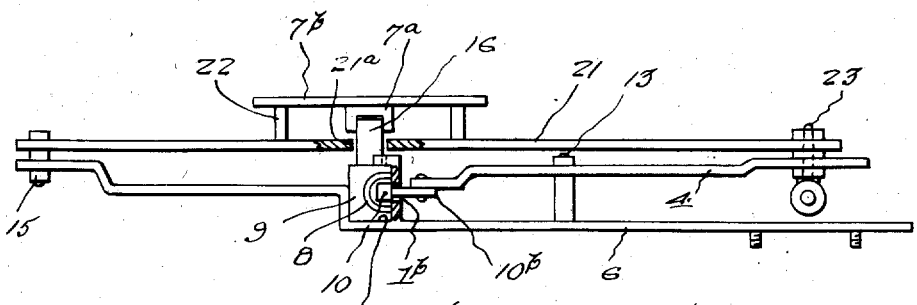
Fig. 3 is a bottom plan view of the attachment with certain parts broken away and shown in section.
Figures 5, 6, 7:
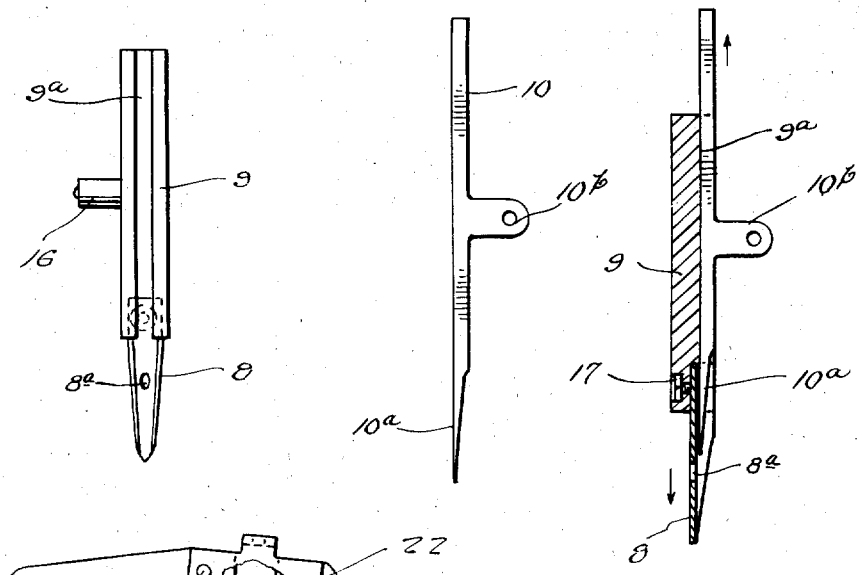
Fig. 5 is a detail view showing the hole punching and the yarn pushing needles assembled.
Fig. 6 is an elevational view of the hole punching needle.
Fig. 7 is a side edge elevational view of the yarn follower or pushing needle.
Figure 4:
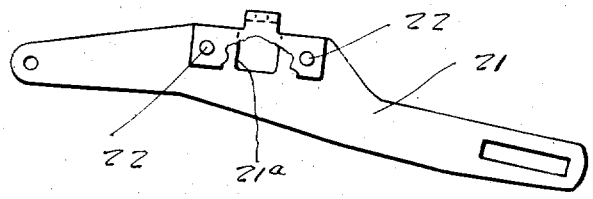
Fig. 4 is an elevational view of a lever member.

For accommodating the lug 10ᵇ, the guide tube 1 is provided at one side thereof with a suitable slot 1ᵇ as shown in Fig. 9. Also, and as will be clear from a study of Figs. 1 and 2, slot 3ᵃ accommodates the needles 8 and 10ᵃ.

In actual practice, the material is fed over the guide 3 and supported thereby, and with the sewing machine in operation, first the hole punching needle 8 moves downwardly through the slot 3ᵃ to punch a hole in the cloth. Manifestly, the hole punching needle 8 will move downwardly in response to the downward movement of the needle bar 5. As the needle bar 5 begins to rise, the hole punching needle 8 will also begin to rise while the needle 10ᵃ will start downwardly. The timing of the operation is such that before the punch needle 8 is actually withdrawn from the work, needle 10ᵃ engages the yarn for forcing the yarn through the holes made by the needle 8. Due to the differences in the lengths of levers 21 and 4, the punch needle 8 has sufficient time to operate before the same rises from the goods for the next stitch; and further, this difference in length between the levers, together with the position of their respective fulcrums 15, 13 brings about the opposite motions of the needles 8 and 10ᵃ.

The plate 6 is also provided with a suitably located slot 20 to accommodate the usual thread take-up lever on the sewing machine.

Also for securing the needle 8 at the desired adjustment, screw 17 is loosened, needle 8 is positioned at the desired adjustment after which the screw 17 is threaded home against the needle to secure the same at the desired position of adjustment.

It is thought that a clear understanding of the construction, utility and advantages of an invention of this character will be had without a more detailed description.

Having thus described the invention, what is claimed as new is:

1. In combination with a sewing machine having a head and a reciprocating needle bar, an attachment plate set on the base of the machine and serving as a bobbin cover, said plate having a material guide rising therefrom, and said guide having a lateral end portion provided with a slot, a plate secured to the head of the machine and provided with a tubular guide formation, a hole punching needle having a sliding fit in said tubular guide formation and a working end adapted to pass through the slot in said guide incidental to punching a hole in the material, a needle for pushing yarn through the hole punched by the punching needle and having a sliding fit with the hole punching needle, and mechanism operatively connecting the needle bar of the sewing machine with the hole punching needle and the yarn pushing needle respectively for transmitting movement of the needle bar to the hole punching and yarn pushing needles respectively for reciprocating said needles in reverse directions relative to one another.

2. In combination with a sewing machine having a head and a reciprocating needle bar, an attachment plate set on the base of the machine and serving as a bobbin cover, said plate having a material guide rising therefrom, and said guide having a lateral end portion provided with a slot, a plate secured to the head of the machine and provided with a tubular guide formation, a hole punching needle having a sliding fit in said tubular guide formation and a working end adapted to pass through the slot in said guide incidental to punching a hole in the material, a needle for pushing yarn through the hole punched by the punching needle and having a sliding fit with the hole punching needle, mechanism operatively connecting the needle bar of the sewing machine with the hole punching needle and the yarn pushing needle respectively for transmitting movement of the needle bar to the hole punching and yarn pushing needles respectively for reciprocating said needles in reverse directions relative to one another, said mechanism including a lever pivoted at one end to said plate and having at its respective opposite end a lost motion connection with said needle bar, and interengaging means on the hole punching needle and on said lever for transmitting movement of said lever to the hole punching needle.

3. In combination with a sewing machine having a head and a reciprocating needle bar, an attachment plate set on the base of the machine and serving as a bobbin cover, said plate having a material guide rising therefrom, and said guide having a lateral end portion provided with a slot, a plate secured to the head of the machine and provided with a tubular guide formation, a hole punching needle having a sliding fit in said tubular guide formation and a working end adapted to pass through the slot in said guide incidental to punching a hole in the material, a needle for pushing yarn through the hole punched by the punching needle and having a sliding fit with the hole punching needle, mechanism operatively connecting the needle bar of the sewing machine with the hole punching needle and the yarn pushing needle respectively for transmitting movement of the needle bar to the hole punching and yarn pushing needles respectively for reciprocating the said needles in reverse directions relative to one another, said mechanism including a lever pivoted at one end to said plate and having at its respective opposite end a lost motion connection with said needle bar, interengaging means on the hole punching needle and on said lever for transmitting movement of said lever to the hole punching needle, and a second lever pivoted intermediate its ends to said plate and having one end pivoted to the yarn pushing needle, and at its respective opposite end having a lost motion connection with said needle bar.

4. In an attachment for sewing machines, a plate adapted to be attached to the head of a sewing machine in the place of the usual head plate, said attaching plate being provided intermediate its ends with a tubular guide formation, a pair of nested needles having a working fit within said tubular guide formation and including a hole punching needle and a yarn forcing needle, said hole punching and yarn forcing needles being mounted for sliding movement in reverse directions relative to one another, and mechanism connecting said needles with the usual needle bar of the sewing machine for transmitting movement of the needle bar to said needles.

5. In combination with a sewing machine having a reciprocating needle bar, a supporting frame provided with means for attachment to the machine and also provided with guide means, a hole punching needle having a sliding fit in said guide means and a working end adapted to punch a hole in the material, a needle for pushing yarn through the hole punched by the punching needle and having a sliding fit with said punching needle, means carried by said frame for connecting the needle bar of the machine with the hole punching needle and the yarn pushing needle for reciprocating said needles in reverse directions relatively to each other, and a material supporting member securable to the bed of the machine, said member having a slot through which the end of the hole punching needle passes.

6. In combination with a sewing machine having a reciprocating needle bar, a supporting member, means for attaching said member to the machine, said member being provided with means presenting a guideway, a pair of nested needles having a sliding fit in said guideway and including a hole punching needle and a yarn forcing needle, said needles being mounted for sliding movement in reverse directions relatively to one another, and mechanism carried by said supporting member for connecting said needles with the usual needle bar of the sewing machine for transmitting movement of the needle bar to said needles.

7. In combination with a sewing machine having a reciprocating needle bar, an attachment therefor comprising a supporting frame member adapted for attachment to the machine, a pair of nested needles including a hole punching needle and a yarn forcing needle, said needles being guided for vertical reciprocating movement on said frame and for sliding movement in reverse directions relative to one another, and mechanism carried by said frame member for connecting said needles with the usual needle bar of the sewing machine for transmitting movement of the needle bar to said needles but in opposite directions.

8. In combination with a sewing machine having a reciprocating needle bar, an attachment therefor comprising a supporting frame member adapted for attachment to the machine, a pair of nested needles including a hole punching needle and a yarn forcing needle, said needles being guided for vertical reciprocating movement on said frame and for sliding movement in reverse directions relatively to one another, and mechanism carried by said supporting member for connecting said needles with the usual needle bar of the sewing machine for transmitting movement of the needle bar to said needles, said mechanism including a pair of levers connected to the needle bar and to the needles and pivoted on the supporting frame, the pivotal points of said levers being so related to the connection with the needles that one of the latter is operated in a direction opposite to that of the other.

EARL HELLE.